US009418052B2

(12) United States Patent
Shelby

(10) Patent No.: US 9,418,052 B2
(45) Date of Patent: Aug. 16, 2016

(54) METHOD AND APPARATUS FOR WEB SERVICE SCHEMA MANAGEMENT

(75) Inventor: Zachary Shelby, Sotkamo (FI)

(73) Assignee: ARM FINLAND OY, Oulu (FI)

( * ) Notice: Subject to any disclaimer, the term of this patent is extended or adjusted under 35 U.S.C. 154(b) by 516 days.

(21) Appl. No.: 12/768,789

(22) Filed: Apr. 28, 2010

(65) Prior Publication Data
US 2011/0270895 A1     Nov. 3, 2011

(51) Int. Cl.
*G06F 17/22*     (2006.01)

(52) U.S. Cl.
CPC ........ *G06F 17/2252* (2013.01); *G06F 17/2247* (2013.01)

(58) Field of Classification Search
USPC .................................. 707/800–805
See application file for complete search history.

(56) References Cited

U.S. PATENT DOCUMENTS

| 7,596,622 B2* | 9/2009 | Owen et al. ........... 709/230 |
| 2005/0193135 A1* | 9/2005 | Owen et al. ........... 709/230 |
| 2007/0005786 A1* | 1/2007 | Kumar et al. ......... 709/230 |
| 2008/0098002 A1 | 4/2008 | Mehta et al. |
| 2008/0098019 A1 | 4/2008 | Sthanikam et al. |
| 2008/0313219 A1 | 12/2008 | Benfield et al. |
| 2009/0319680 A1* | 12/2009 | Owen et al. ........... 709/230 |

FOREIGN PATENT DOCUMENTS

WO     2007/092863     8/2007

OTHER PUBLICATIONS

Castellani et al., "Architecture and Protocols for the Internet of Things: A Case Study", Julkaisussa Proceedings of the 8$^{th}$ IEEE International Conference on Pervasive Computing and Communicaitons Workshops, pp. 678-683, (2010).
Finnish Search Report for Finnish Application No. 20105461, dated Feb. 24, 2011.

* cited by examiner

*Primary Examiner* — Christyann Pulliam
*Assistant Examiner* — Navneet K Gmahl
(74) *Attorney, Agent, or Firm* — Barnes & Thornburg LLP

(57) ABSTRACT

The invention relates to a method and an apparatus for web service schema management. The apparatus includes a processor; a memory including computer program code configured to, with the processor, cause the apparatus at least to perform: controlling the storing of schema information of a binary web service system, the schemas describing the encoding/decoding of binary XML messages; and providing an interface for maintaining the schema information up-to-date in each component of the binary web service system.

16 Claims, 9 Drawing Sheets

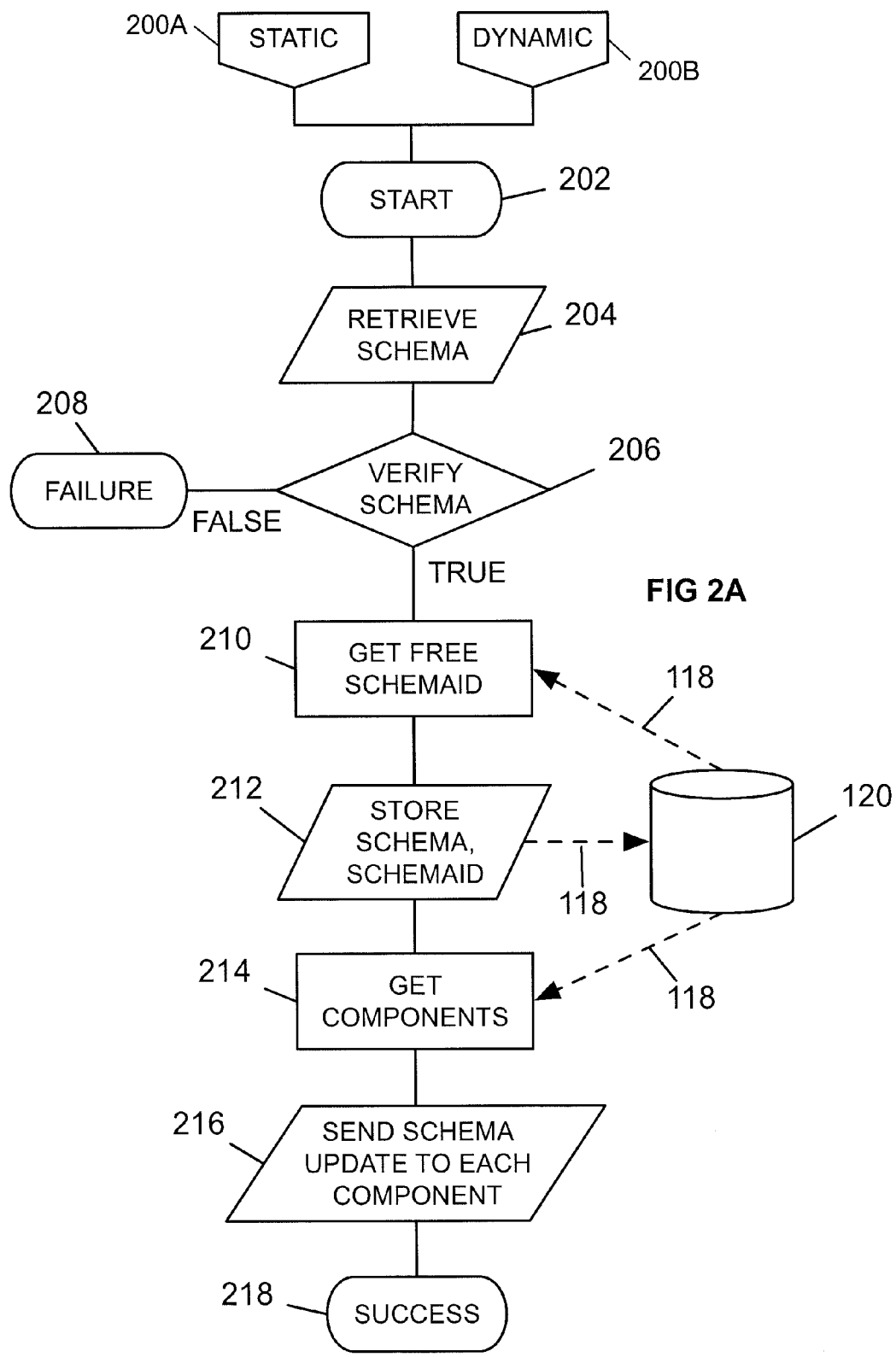

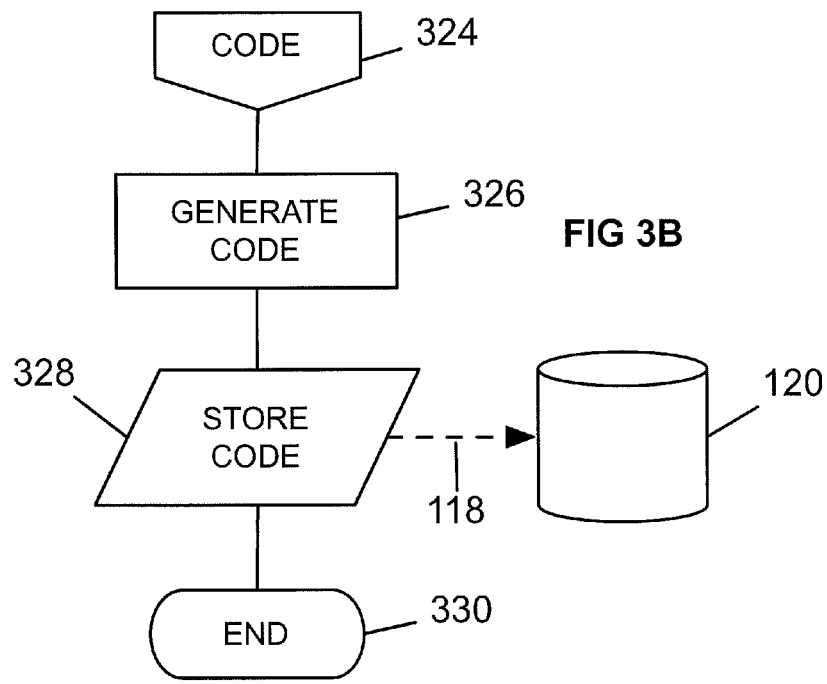
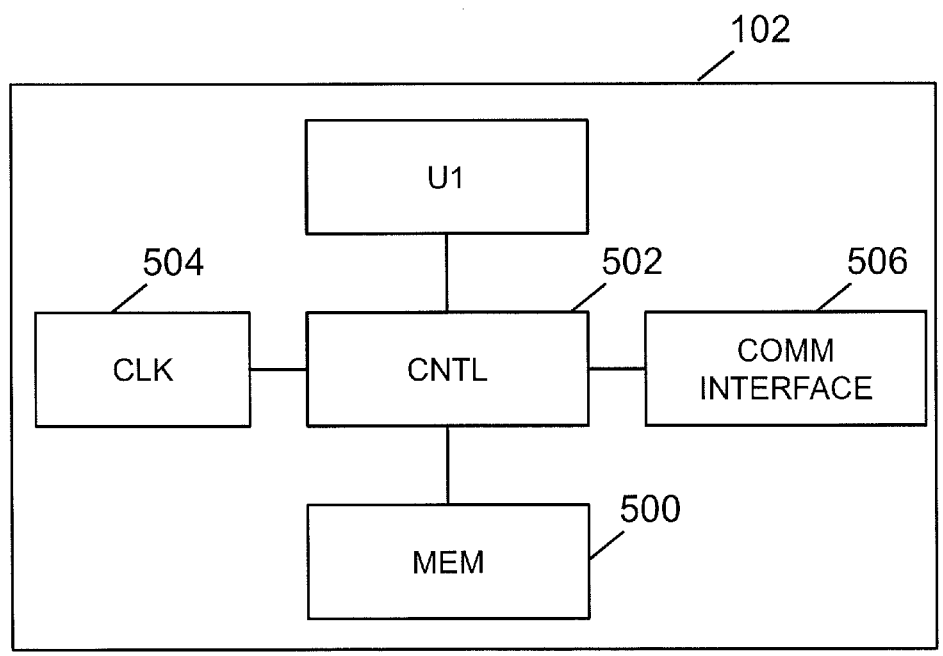

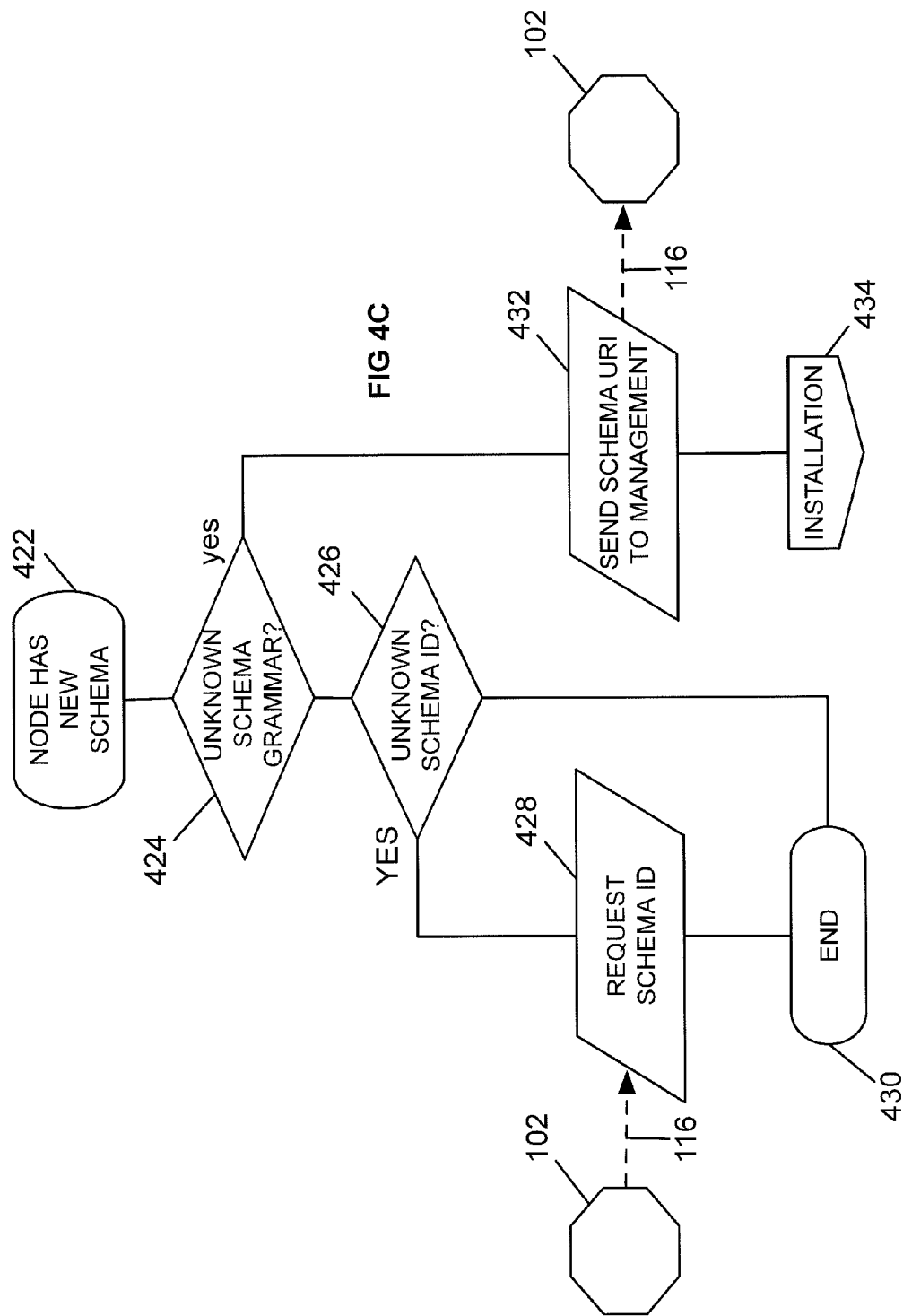

METHOD AND APPARATUS FOR WEB SERVICE SCHEMA MANAGEMENT

FIELD

The invention relates to a method and an apparatus for web service schema management. In particular, the invention relates to managing schemas utilized in binary web services between computer servers or nodes in computer networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In modern communication and computer networks, data exchange between programs and computers is a vital element. Different programs, computers and processors exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

The exchanges of interoperable messages using APIs (Application Program Interfaces) provided by servers on the Internet are realized by using web services. A web service can be realized in many ways, usually by using a REST (Representational State Transfer) design with the built-in features of a web protocol like HTTP and payload encoding with Extensible Markup Language (XML), or realized as a remote procedure call via SOAP (Simple Object Access Protocol).

SOAP is an Internet service messaging protocol which is widely used in the transmission of automated messages between computer servers on the Internet. SOAP provides an extensible format for providing message exchanges between computers to achieve any given task. At present, the content of a SOAP message is encoded by using XML. XML can be used to represent any kind of information. The messages are made up of structured XML tags. When SOAP messages are transmitted over the Internet, they use an application protocol such as HTTP over TCP/IP or Session Initiation Protocol (SIP) over TCP/IP.

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In the low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

Typical web services use XML for content encoding, making use of XML schemas having well-known or easily available namespace information. Furthermore, even in the absence of exact schema information, an XML document can be parsed by an end point. However, the same is not true in binary web services. In order to achieve the very small overhead requirements, XML encoding technologies such as EXI make use of out-of-band Schema information (so-called Schema-informed Mode in EXI). The deployment of binary web services requires a large range of components, including embedded device clients, proxies and servers. In order for this system to function most efficiently, all components must have the correct schema information and be able to identify which schema to use for which binary web service payload.

Currently, if a schema has been used in the encoding of a message a schema ID may be included in the header of the message. However, the current state-of-the-art only describes how schema information is used to encode or decode a payload, but not how to identify, manage and optimize schemas across an entire binary web service system (called a domain).

BRIEF DESCRIPTION

An object of the invention is to provide an improved solution for web service schema management between computer servers or nodes in computer networks.

According to an aspect of the present invention, there is provided an apparatus, comprising a processor; a memory including computer program code configured to, with the processor, cause the apparatus at least to perform: controlling the storing of schema information of a binary web service system, the schemas describing the encoding/decoding of binary XML messages; providing an interface for maintaining the schema information up-to-date in each component of the binary web service system.

According to another aspect of the present invention, there is provided a method, comprising: controlling the storing of schema information of a binary web service system, the schemas describing the encoding/decoding of binary XML messages; and providing an interface for maintaining the schema information up-to-date in each component of the binary web service system.

According to an aspect of the present invention, there is provided an apparatus, comprising means for controlling the storing of schema information of a binary web service system, the schemas describing the encoding/decoding of binary XML messages; means for providing an interface for maintaining the schema information up-to-date in each component of the binary web service system.

According to an aspect of the present invention, there is provided an apparatus, comprising a processor; a memory including computer program code configured to, with the processor, cause the apparatus at least to perform: loading a schema describing the encoding/decoding of binary XML messages; analyzing the schema with one or more test payloads; optimizing the schema on the basis of the analysis; generating a code library on the basis of the schema.

LIST OF DRAWINGS

Embodiments of the present invention are described below, by way of example only, with reference to the accompanying drawings, in which FIG. 1 illustrates an example of a system to which embodiments of the invention may be applied;

FIGS. 2A, 2B and 2C are flowcharts illustrating embodiments of the invention;

FIGS. 3A, 3B, 4A, 4B and 4C are flowcharts illustrating embodiments of the invention; and FIG. 5 illustrates an example of a management apparatus.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

As already stated, modern applications running in computing equipment connected to communication and computer networks communicate with each other. Web service methods such as SOAP or REST were designed to provide a suitable platform for communication between applications running in different environments, operating systems and computers.

In general, web services utilize XML for content encoding. The messages sent are XML documents which contain given elements, some of which are required and some optional. Web services may utilize XML schemas which describe how data is encoded in the messages and which elements are required and optional. In practice, a schema describes the grammar used in the encoding of a payload in the messages and usually includes links to other references, such as namespaces. A schema is a description of the structure of an XML document. Other format information markups, such as Abstract Syntax Notation One (ASN.1) also make use of a Schema-like description of the grammar and structure of the information.

Figure 1:
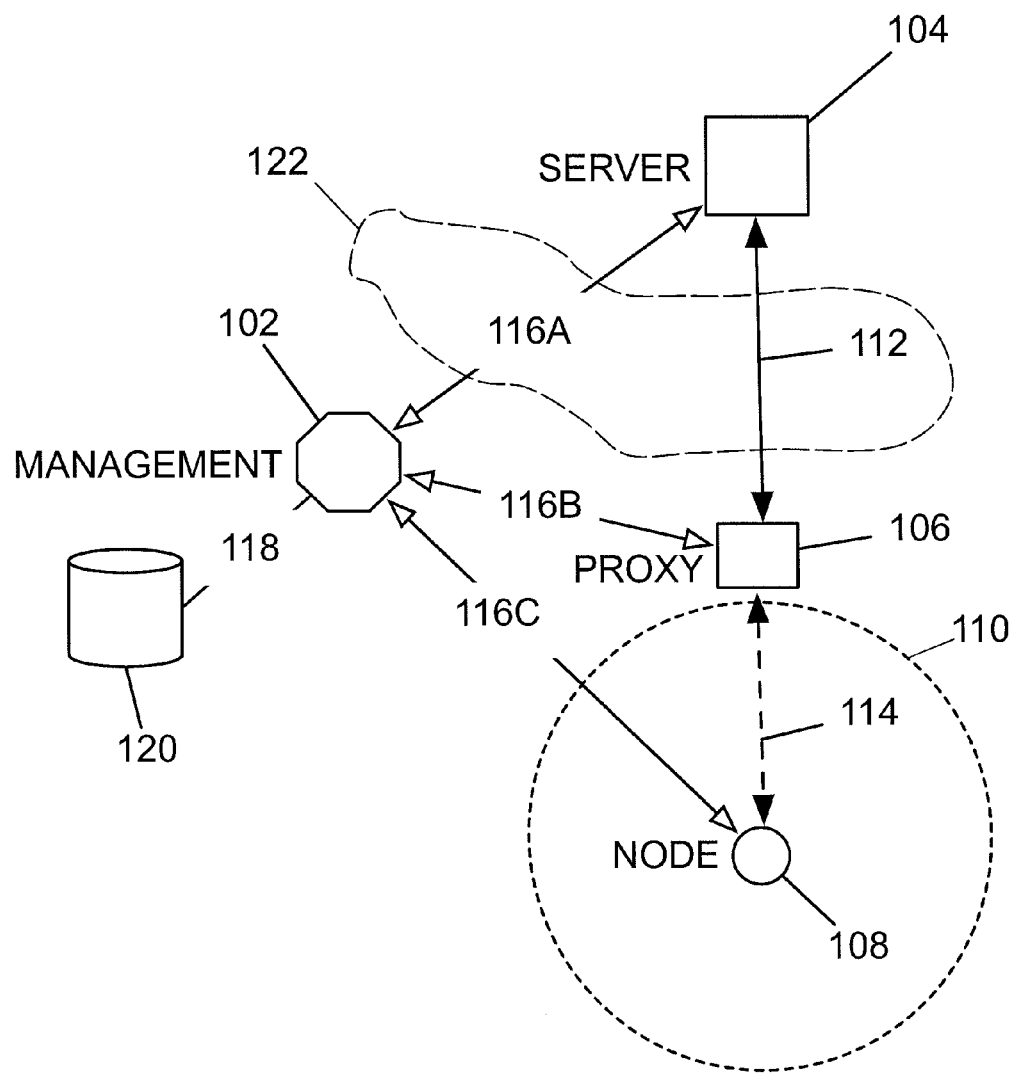

FIG. 1 illustrates an example of a network to which embodiments of the invention may be applied. The example network of FIG. 1 comprises a low-power wireless network 110, the Internet/Intranet 122 and an IP-based network with a server 104. The low-power wireless network may be connected to the Internet/Intranet and the IP-based network via an intermediate node 106, which is physically either a wireless router between the low-power wireless network and the Internet/Intranet or an edge server located in the IP network. The logical functionality of the intermediate node may even be realized at the server.

In the Internet/Intranet 122 and the IP-based network with a server 104 messaging is implemented by using XML encoding and transmitted by using HTTP over TCP/IP.

The low-power wireless network 110 may be a multihop network comprising a set of wireless low-power nodes. In this simplified example, one node 108 is illustrated.

In an embodiment, the wireless links in the wireless network 110 may be realized by using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

A binary web service system makes use of web service protocols (either a binary protocol or full HTTP) and a binary encoded payload content. These binary techniques are typically applied in a constrained network or with constrained devices which do not have the resources or capacity to realize full web services. In FIG. 1 the low-power wireless network 110 is such a constrained domain consisting of a constrained node 108 which makes use of a binary web service protocol and payload data 114. The intermediate node or proxy 106 may be used to convert between binary web service protocols and payloads to full web services 112. Such a proxy may also be used as a cache or to provide extra security to a constrained domain without converting protocols or payload encodings. In case the payload remains encoded 112, the server 104 must also be aware of the payload encoding schema information.

In order for the system architecture in FIG. 1 to operate efficiently, out-of-band schema information is used to encode the payload content. This is typically XML Schema information used to encode/decode between the XML content and EXI or Fast Infoset formats, for example. Any entity that wants to parse, encode or decode the payload must know the correct schema information.

In an embodiment, the network of FIG. 1 comprises a management apparatus 102 and a schema configuration storage 120 operationally connected to the management apparatus. One or more components 104, 106, 108 of the network involved with the binary web service system make use of schema information managed by the management apparatus.

The management apparatus 102 is configured to provide a schema management interface 116a to 116c used with all system components. The management apparatus 102 also has an interface 118 with the schema storage 120. The management apparatus may be realized and situated in many ways. Typically the apparatus 102 is a stand-alone application in a separate server. It may be integrated into one of the other system components, such as the server 104 or the intermediate node or proxy 106.

In order for the binary web service system to operate efficiently, the same schema configuration must be available on all components. In an embodiment, the management apparatus 102 is configured to maintain schema related information and provide the web service system with the information via the schema management interface 116a to 116c. The schema information must be consistent within the same domain. A domain may be defined as a set of web service components (nodes, proxies and servers) administered by a management entity sharing the same schema configuration. A management entity may maintain multiple domains, and components may participate in multiple domains (in this case Schema ID spaces between domains must not overlap).

The schemas of a domain are assigned a unique identification, a SchemaID. The identification may be an integer, but it may as well be an alphanumeric name or any other suitable identifier. In an embodiment, the management apparatus 102 is configured to assign each schema of the domain a unique identifier and maintain information on the identifiers and schemas defined in the domain. The management apparatus 102 may store the information related to the identifiers and schemas in the storage 120.

In the case of an XML Schema, schema-related information may be a URI pointing to the actual schema on the Internet. URI refers to Uniform Resource Identifier. An example of a URI is a web address (Uniform Resource Locator, URL). An example of a URI pointing to a schema on the Internet is: http://www.example.com/SensorData.xsd In an embodiment, the management apparatus is configured to keep track of a set of schema information for each domain under the apparatus. The information may be stored in the storage 120. The schema information may include the domain, the SchemaID which is always unique within a domain and a URI to the schema which may be stored locally or remotely. The schema information may also comprise other configuration information. The following is an example of schema information for a domain called www.example.com:

| Domain | SchemaID | Schema |
|---|---|---|
| www.example.com | 0 | http://www.example.com/Default.xsd |
| www.example.com | 1 | http://www.example.com/SensorData.xsd |
| www.example.com | 2 | http://www.example.com/EnergyMessage.xsd |
| www.example.com | 3 | http://www.example.com/Actuator.xsd |

In the above example, the schema information comprises information on four different schemas with SchemaIDs 0, 1, 2 and 3.

When a component of the system (a node, a proxy or a server) receives an encoded web service payload, it must know the schema in order to decode it. In an embodiment, the SchemaID is carried either in the header of the web service protocol, such as in the content-type header of HTTP or corresponding payload type of other protocols, or in the header of the payload encoding itself. The EXI standard provides such a field for a Schema ID in its own payload header, which can be decoded without yet knowing the payload's schema. Alternatively the Schema ID may be carried just after the protocol header, but just before the encoded payload as a kind of "magic byte". Once the SchemaID of the encoded payload is determined, the schema information is retrieved, verified and then used for decoding.

In an embodiment, schema configuration information and the related schemas are stored locally on each component. The schema configuration interface 116a to 116c of the management apparatus 102 is used to maintain the same schema configuration on all components in the same domain.

The information stored by the management apparatus 102 may be updated in various ways. In an embodiment, the schemas are installed in all components by a management tool. The addition of a new schema to the system is triggered manually through a user or a computer interface. This method may be called a static mode.

In an embodiment, components of the system automatically discover and configure new schema information. The addition of a new schema to the system happens automatically through schema discovery as new schemas are detected. This method may be called a dynamic mode.

FIG. 2A is a flowchart illustrating an embodiment of invention. FIG. 2A illustrates an example of the general procedure for the management of schemas in a binary web service system. In an embodiment, the procedure is executed in the management apparatus 102 of FIG. 1.

The procedure starts as a result of either a static schema assignment 200A through the user interface of a management tool or a dynamic schema discovery process 200B where it is detected that a particular schema should be added to the binary web service domain and supported by all components.

First in step 202, a Schema URI (it may point to a local storage or a remote web resource), domain and possibly other configuration information is passed to the process. The information is passed to the process either from the management tool, by a component of the system receiving payload encoded with a schema unknown to the system, or by a component of the system starting to offer a service utilizing payload encoded with a schema unknown to the system.

In step 204, the schema is retrieved from the received URI.

In step 206, the schema is checked for validity by using an appropriate schema verification tool.

If the verification fails in step 208, then a failure code may be returned to the static or dynamic process.

In step 210, a free SchemaID is requested for a valid schema. In an embodiment, the free SchemaID may be determined by querying the schema configuration storage 120.

In step 212, the new SchemaID is then stored along with the Schema URI and possibly the schema itself and other configuration information in the schema configuration storage 120.

Next, the updated schema configuration is installed on all the components belonging to that domain. In this example it is assumed that a list of components is maintained in the storage 120. The management apparatus comprises a schema configuration interface 116A to 116C with each component of the system. In an embodiment, the interface is used by applying a push method where the management apparatus updates the configuration on each component. In an embodiment, the interface is used by applying a pull method where each component polls the management apparatus for new schema information. The polling may be done at given intervals.

FIG. 2A illustrates the push method for installation. In step 214, the list of components is first read from the storage 120.

In step 216, the new schema is sent to each component in turn by using the configuration interface 116A-116C.

The procedure ends in step 218.

Figure 2B:
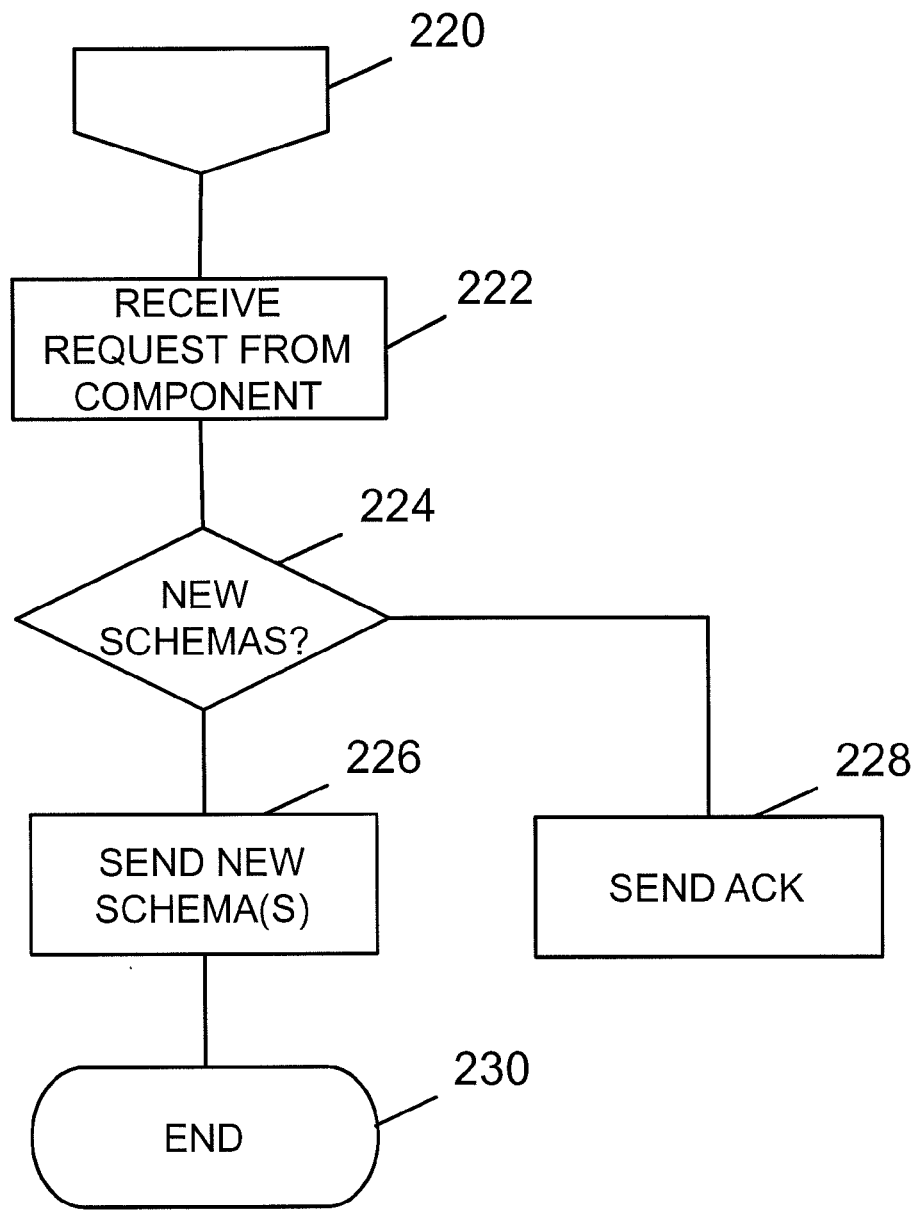

FIG. 2B illustrates the pull method for installation. The procedure begins at step 220, which corresponds to step 212 of FIG. 2A.

In step 222, the management apparatus receives a request for new schema information from a component of the system. The request comes via the configuration interface 116A to 116C.

In step 224, the management apparatus determines whether new schemas have been received since the last update.

If so, the new schema or schemas are sent to the component by using the configuration interface 116A to 116C in step 226. If not, the component is informed in step 228 that no update is available.

The procedure ends in step 230.

Figure 2C:
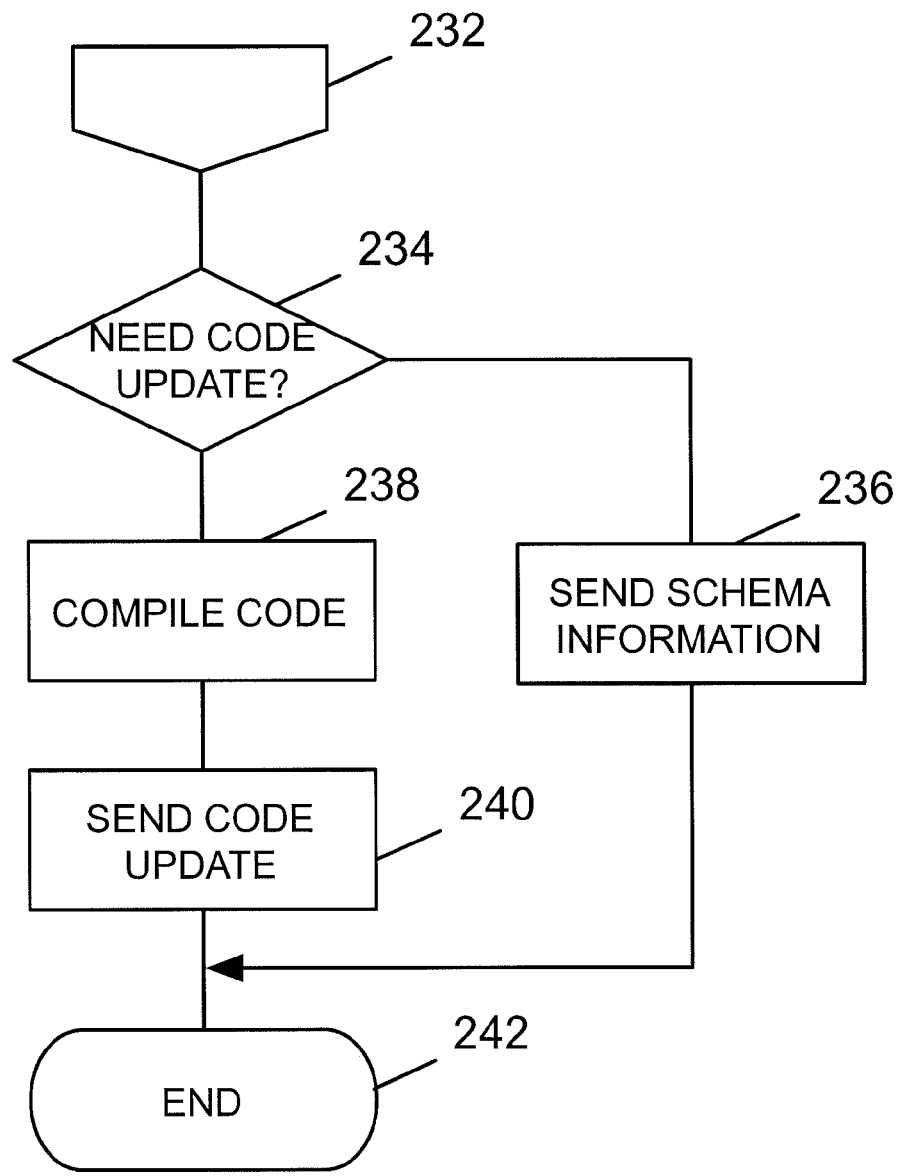

In an embodiment, especially with embedded nodes, a new firmware may have to be compiled or some executable code may have to be sent to a node so that it can handle a new schema. The mere sending of a new schema via the interface is sufficient for nodes having processing power. FIG. 2C illustrates this embodiment. At an embodiment, the procedure of FIG. 2C may replace step 216 of FIG. 2A or step 226 of FIG. 2B.

The procedure begins at step 232. In the beginning of the procedure the new schema and the node to which the schema is to be sent are known.

In step 234 the type of the node is determined. The type of the node indicates whether the code or firmware of the node needs an update or recompilation or whether the sending of schema information is sufficient.

If the code does not need updating, schema information is sent to the node in step 236.

Otherwise, the code or firmware of the node is compiled in step 238 to support the new schema information and the compiled code is sent to the node in step 240. Instead of compiling the code in the management apparatus, a code supporting the schema may be loaded from the Internet or the storage 120.

The procedure ends in step 242. The same procedure may be repeated for all nodes to which the schema information must be sent.

Regarding the pull method of FIG. 2B, the management apparatus may compile the code or firmware dynamically when each node polls for changes in schema information. In an embodiment, the management apparatus compiles the codes in advance and stores the new code or firmware. When a node polls for changes the management apparatus may send the compiled code in return.

Figure 3A:
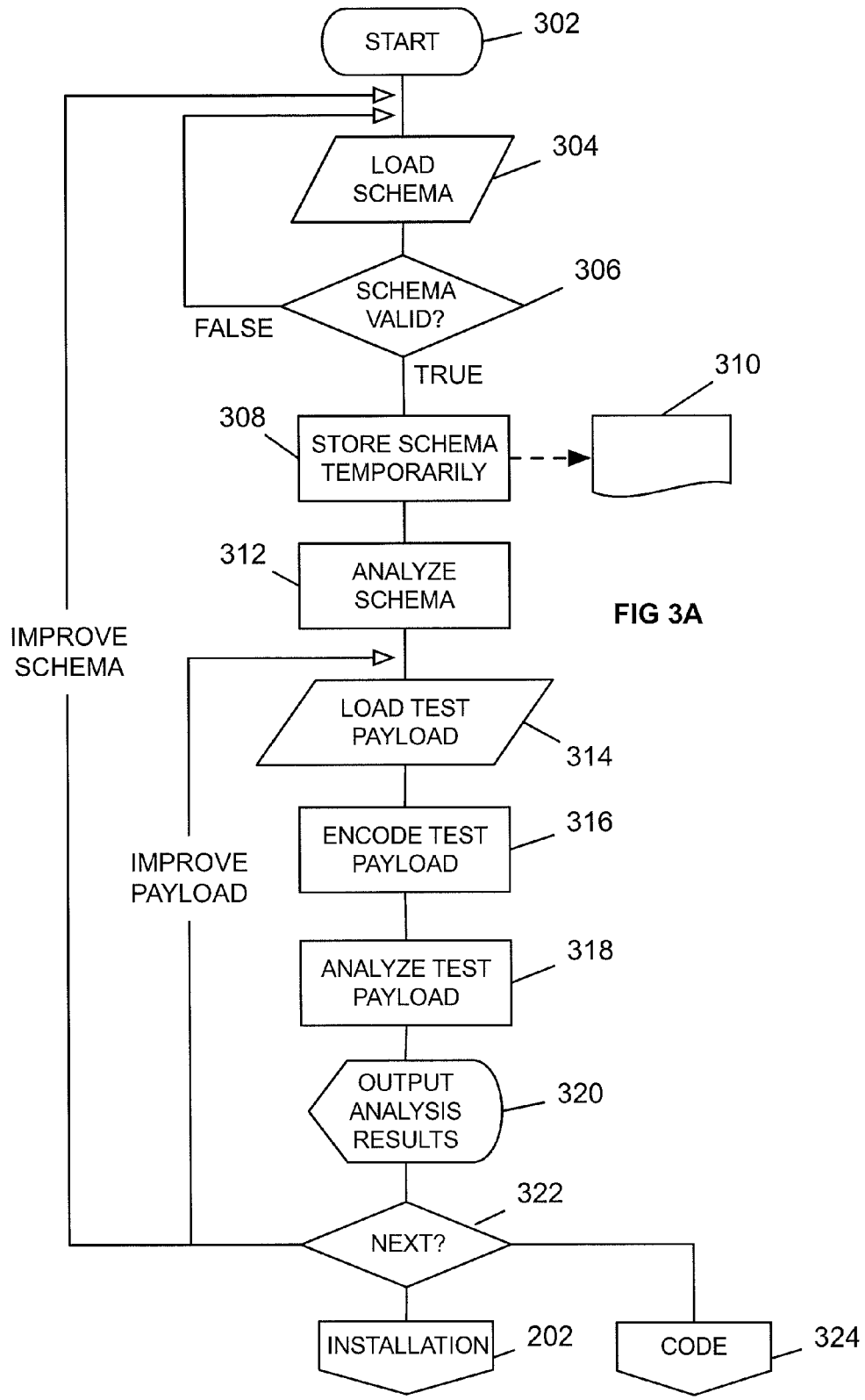

FIG. 3A is a flowchart illustrating an embodiment of invention. FIG. 3A illustrates an example of the static schema assignment method. In an embodiment, the procedure is executed in a server or computer connected to the binary web service system of FIG. 1. In an embodiment, the procedure may be realized with a management tool software module run in the management apparatus or other server or computer.

In the static schema assignment method, a new schema may be added to a binary web service domain by using a manual installation method, realized through a user interface or any appropriate computer API, for example.

The procedure begins at step 302.

In step 304, a schema is loaded into a computer. The schema may be a predesigned schema or it may have been designed using a suitable tool. The tool may be a management tool software module.

In step 306, the loaded schema is verified by using a suitable verification method known in the art. If the schema does not pass the verification, it is reloaded.

In step 308, a verified schema is stored temporarily in a memory 310. When applied to a user interface, an interactive stage may be offered to the user in order to suggest optimizations and corrections to the schema and possible payloads being designed for the best encoding performance. First in step 312, the schema itself is analyzed using knowledge of the encoding technique and schema features.

Next, the user is able to load one or more test payloads in step 314.

In step 316, each test payload is encoded by using the current schema.

In step 318, the results of the encoding are analyzed. This analysis may include, for example, the size of the encoded vs. original payload, the identification of non-optimal fields (e.g. strings) and suggestions for better payload design. In an embodiment, this analysis of the test payload(s) includes checking the completeness of the Schema with regard to the test payload(s), ensuring that every element in the payloads is defined in the Schema. Incomplete Schemas are less efficient using binary XML techniques. Next, the data of each element may be analyzed with respect to the data type of the Schema, whereby unnecessary strings may be identified along with complex structures. Finally, namespaces not defined in the schema can not be compressed in strict schema-informed encodings, thus these are identified as they incur large string overheads.

In step 320, the output of the schema and payload(s) analysis is given to the user or stored.

In step 322, a decision is made whether to install 202 the new schema in the system, or to go back and improve the payload(s) or the schema itself for better performance. In an embodiment, the described improvement cycle is a semi-automated process. In an embodiment, the analyzing and optimizing steps are performed a desired number of times. The desired number may be a predetermined number or it may be received as an input from the user interface. In an embodiment, based on the analysis of inefficient features of the Schema and payload(s), incremental improvements may be made to the Schema and also to the payloads using the encoding efficiency results as a measure of success.

If the schema is installed, it is passed onto the schema installation procedure of FIG. 2A.

FIGS. 3A and 3B illustrate another embodiment of invention. In this embodiment, the management tool software module tool may be utilized to execute the process described in connection with FIG. 3A to produce a new code library for the developers for embedded devices to be able to use this new Schema in the development of a firmware. In this embodiment, the process is performed according to FIG. 3A till step 324, from which the process continues according to FIG. 3B. Thus, the management tool software module tool may be configured to analyze and optimize a schema and test the schema with various payloads.

In step 326, a firmware library is created from the optimized schema. In step 328 the firmware library is stored to storage 120. This firmware may be later used in the procedure of FIG. 2C. The process ends in step 330. The process may be realized as the management tool software module tool run in the management apparatus or other server or computer. The tool does not need an online connection to the components of a binary web service while running the process of FIGS. 3A and 3B.

Figure 4A:
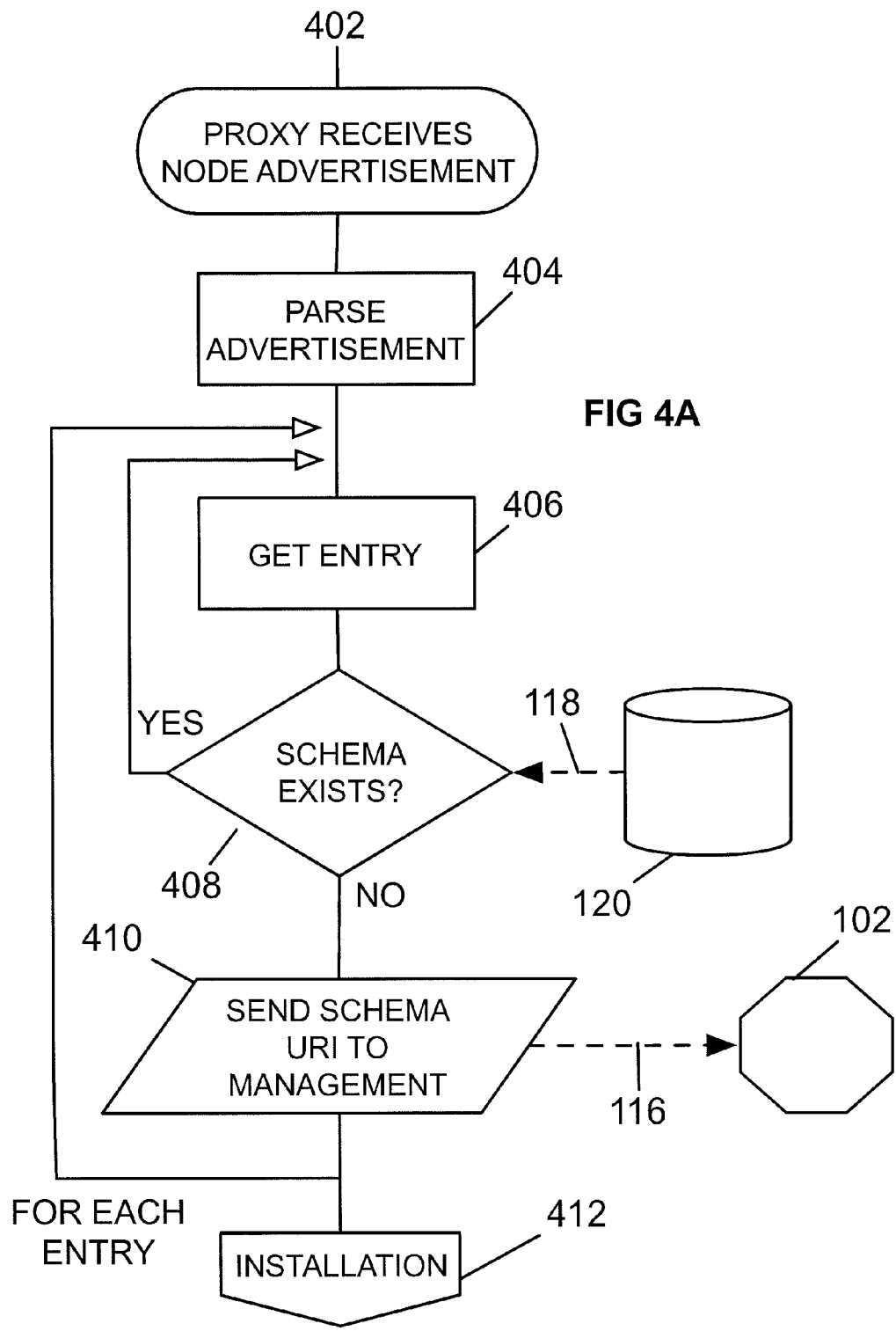
Figure 4B:
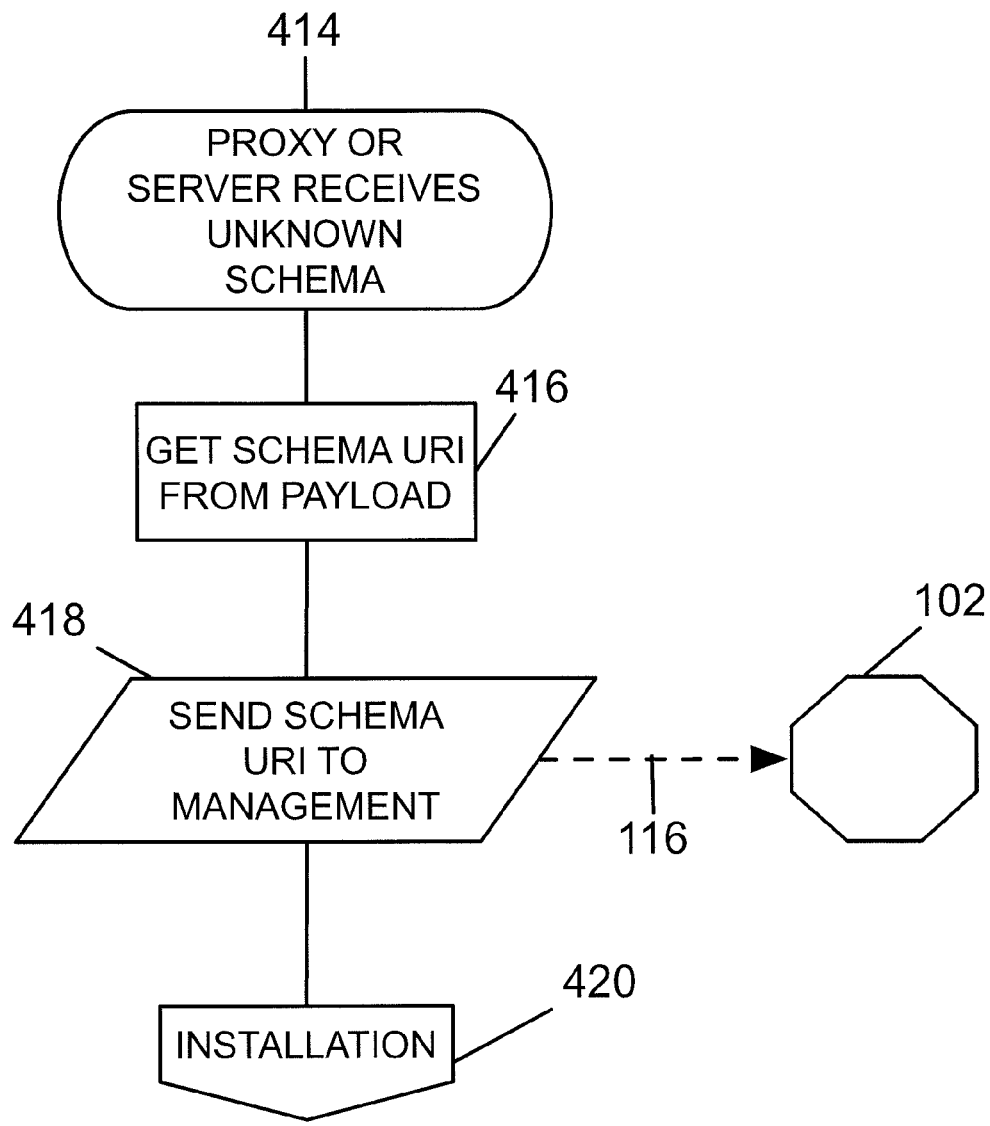

FIGS. 4A to 4C are flowcharts illustrating embodiments of invention. Figures illustrate examples of the dynamic schema assignment method where the components of the domain initialize the procedure of installing a new schema in the domain. Figures shows three different examples when a schema could be dynamically discovered.

FIG. 4A illustrates an example 402 where a proxy may receive an advertisement from a node about the resources if offers. Such an advertisement contains information about the input/output payload schemas for its resources (in the Web Application Description Language (WADL) or the Web Services Description Language (WSDL) format, for example). This kind of situation may arise when a new node is installed in a domain, for example.

In step 404, the proxy parses the advertisement and determines the number of schemas in the advertisement.

In step 406, the proxy retrieves a schema.

In step 408, the proxy checks whether the schema is known in the domain. In an embodiment, the proxy queries 118 the schema from the storage 120.

In step 410, the URIs of the new schemas are sent to the management apparatus 102 via the interface 116 (116A to 116C). Steps 406 to 410 are performed for all schemas in the advertisement. The procedure continues 412 according to FIG. 2A.

FIG. 4B illustrates an example 414 where a proxy or a server has received a new request with a non-encoded payload (in a full web service HTTP request, for example).

In step 416, the proxy or the server extracts the full Schema URI from the payload itself. A well-formed XML payload includes the schema URI.

In step 418, the schema URI is sent to the management apparatus 102 via the interface 116 (116A to 116C). The procedure continues 420 according to FIG. 2A.

FIG. 4C illustrates an example 422 where an application on a node of the domain requests the use of a new schema. This kind of situation may arise when a node of a domain is updated with new services, for example. Alternatively, a node may request the use of a schema that does exist but the node does not know which SchemaID to use.

In step 424 it is checked whether the schema exists in the domain's configuration.

If not, the URI of the new schema is detected. The URI may point to the Internet or the node may store the schema. The schema URI is sent to the management apparatus 102 via the interface 116 (116A to 116C) in step 432. The procedure continues 434 according to FIG. 2A.

If the schema exists, it is checked in step 426 whether the schema ID is unknown. If not, the procedure ends in 430.

If the SchemaID is unknown, a new SchemaID is requested from the management apparatus 102 via the interface 116 (116A to 116C) in step 428.

The procedure ends in 430.

FIG. 5 illustrates an example of the management apparatus 102. The management apparatus 102 may be implemented as an electronic digital computer, which may comprise a working memory (RAM) 500, a central processing unit (CPU) 502, and a system clock 504. The CPU 502 may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The management apparatus 102 is configured to be in connection with the low-power wireless network and the Internet/Intranet with a suitable interface 506. The interface may comprise a wireless transceiver configured to provide the apparatus with a wireless connection and a transceiver configured to provide the apparatus with a connection to the Internet. The transceivers may be realized by using solutions known in the art. In addition, the apparatus may comprise a user interface 608 such as a display and a keyboard, for example. The node may comprise a memory 500 for storing software and other data. The apparatus comprises a processing unit 502 configured to perform the process described in connection with FIGS. 2A and 2B. The processing unit may be configured to control the storing of schema information of a binary web service system, the schemas describing the encoding/decoding of binary XML messages; and control the apparatus to provide an interface for maintaining the schema information up-to-date in each component of the binary web service system, the interface being configured to communicate with the components of the system utilizing appropriate protocols and methods.

In an embodiment, the apparatus may be realized as software in a router or a computer connected to a binary web service domain or in a proxy or node between the low-power wireless network and the Internet/Intranet or an edge server located in the IP network.

An embodiment provides a computer program embodied on a distribution medium, comprising program instructions which, when loaded into an electronic apparatus, execute a computer process, the process comprising: controlling the storing of schema information of a binary web service system, the schemas describing the encoding/decoding of binary XML messages; and providing an interface for maintaining the schema information up-to-date in each component of the binary web service system.

The computer program may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
a processor;
a memory including computer program code configured to, with the processor, cause the apparatus at least to:
control the storing of schema information of a binary web service system comprising one or more servers, and more than one wireless low-power nodes as components of the system, the schema information including a Uniform Resource Identifier of the schema and an assigned identification and domain, wherein the schema assigned identification is provided in a header of a binary XML message payload that is encoded using efficient XML interchange (EXI), the schemas describing the encoding/decoding of binary XML message payloads using EXI,
receive an address relating to a schema;
assign an identification to the received schema;
store the received schema and the assigned identification of the received schema; and
distribute information regarding the received schema to the components of the system; and
wherein for each binary XML message controlling the storing comprises:
extracting the assigned identification of the schema from the payload header of the EXI encoded payload of the binary XML message; and
retrieving the schema information for decoding the EXI encoded payload of the binary XML message using the extracted assigned identification;
providing an interface for maintaining the schema information up-to-date in each component of the binary web service system by distributing the schema information to components of the system,
wherein the processor and the memory including computer program code are further configured to cause the apparatus to send each component of the system a message regarding the schema via the interface to maintain the schema information up-to-date in each component of the binary web service system, and
wherein the processor and the memory including computer program code are further configured to cause the apparatus to verify the schema for validity, analyse the schema with one or more test payloads, and optimize the schema on the basis of the analysis, before storing and distributing the schema.

2. The apparatus of claim 1, wherein the processor and the memory including computer program code are further configured to cause the apparatus to:
receive via the interface a request regarding new schemas from a component and respond by sending information regarding the stored schema.

3. The apparatus of claim 1, wherein the processor and the memory including computer program code are further configured to cause the apparatus to: receive via the interface information on a new schema to be added to the system from a computer operationally connected to the system.

4. The apparatus of claim 1, wherein the processor and the memory including computer program code are further configured to cause the apparatus to: receive, via the interface, from a component of the system a request to add a new schema to the system, the request comprising the address of the schema.

5. The apparatus of claim 1, wherein the schema information comprises the identification of the schema, the address of the schema, and identification of the system.

6. The apparatus of claim 1, wherein the processor and the memory including computer program code are further configured to cause the apparatus to: compile the firmware or code of a node to support the new schema information; and send the firmware or the code to a node.

7. A method, comprising:
controlling the storing of schema information of a binary web service system comprising one or more servers and more than one wireless low-power nodes as components of the system, the controlling including verifying schema for validity, analysing the schema with one or more test payloads, and optimizing the schema on the basis of the analysis, before storing the schema information, the schema information including a Uniform Resource Identifier of the schema and an assigned identification and domain, wherein the schema assigned identification is provided in a header of a binary XML message payload that is encoded using efficient XML interchange (EXI), the schema describing the encoding/decoding of binary XML message payloads using EXI,
receiving an address relating to a schema;
assigning an identification to the received schema;
storing the received schema and the assigned identification of the received schema; and
distributing information regarding the received schema to the components of the system,
wherein for each binary XML message controlling the storing comprises:
extracting the assigned identification of the schema from the payload header of the EXI encoded payload of the binary XML message; and
retrieving the schema information for decoding the EXI encoded payload of the binary XML message using the extracted assigned identification;
providing an interface for maintaining the schema information up-to-date in each component of the binary web service system by distributing the schema information to components of the system; and
following verification of the validity of the schema, sending each component of the system a message regarding the validated schema via the interface to maintain the schema information up-to-date in each component of the binary web service system.

8. The method of claim 7, further comprising: receiving, via the interface, a request regarding new schemas form a component and responding by sending information regarding the stored schema.

9. The method of claim 7, wherein the schema information comprises the identification of the schema, the address of the schema, and identification of the system.

10. The method of claim 7, further comprising:
compiling the firmware or code of a node to support the new schema information; and
sending the firmware or the code to a node.

11. A non-transitory computer program distributing medium readable by a computer and encoding a computer program of instructions for executing a computer process carrying out the method of claim 7.

12. The computer program distribution medium of claim 11, the distribution medium including at least one of the following media: a computer readable medium, a program storage medium, a record medium, a computer readable memory, a computer readable software distribution package, and a computer readable compressed software package.

13. An apparatus, comprising:
means for controlling the storing of schema information of a binary web service system comprising one or more servers, and more than one wireless low-power nodes as components of the system, the controlling including verifying schema for validity, analysing the schema with one or more test payloads, and optimizing the schema on the basis of the analysis, before storing the schema information, the schema information including a Uniform Resource Identifier of the schema and an assigned identification and domain, wherein the schema assigned identification is provided in a header of a binary XML message payload that is encoded using efficient XML interchange (EXI), the schema describing the encoding/decoding of binary XML message payloads using EXI,
means for receiving an address relating to a schema;
means for assigning an identification to the received schema;
means for storing the received schema and the assigned identification of the received schema;
means for distributing information regarding the received schema to the components of the system;
wherein for each binary XML message controlling the storing comprises:
extracting the assigned identification of the schema from the payload header of the EXI encoded payload of the binary XML message; and
retrieving the schema information for decoding the EXI encoded payload of the binary XML message using the extracted assigned identification;
means for providing an interface for maintaining the schema information up-to-date in each component of the binary web service system by distributing the schema information to components of the system, and
means for sending, following verification of the validity, analysis and optimisation of the schema, each component of the system a message regarding the schema via the interface to maintain the schema information up-to-date in each component of the binary web service system.

14. An apparatus, comprising
a processor;
a memory including computer program code configured to, with the processor, cause the apparatus at least to perform:
loading a schema of a binary web service system comprising one or more servers, and more than one wireless low-power nodes as components of the system, the schema information including a Uniform Resource Identifier of the schema and an assigned identification and domain, wherein the schema assigned identification is provided in a header of a binary XML message payload that is encoded using efficient XML interchange (EXI), the schema describing the encoding/decoding of binary XML message payloads using EXI,
receiving an address relating to a schema;
assigning an identification to the received schema;
storing the received schema and the assigned identification of the received schema; and
distributing information regarding the received schema to the components of the system; and
wherein for each binary XML message loading the schema comprises: extracting the assigned identification of the schema from the payload header of the EXI encoded payload of the binary XML message, and retrieving the schema information for decoding the EXI encoded payload of the binary XML message using the extracted assigned information;

verifying the validity of the schema;

analysing the schema with one or more test payloads;

optimizing the schema on the basis of the analysis;

generating a code library on the basis of the schema.

15. The apparatus of claim 14, wherein the processor and the memory including computer program code are further configured to cause the apparatus to repeat the analysing and optimizing steps a desired number of times.

16. An apparatus, comprising:
a processor;
a memory including computer program code configured to, with the processor, cause the apparatus at least to:
control the storing of schema information of a binary web service system comprising one or more servers, and more than one wireless low-power nodes as components of the system, the schema information including a Uniform Resource Identifier of the schema and an assigned identification and domain, wherein the schema assigned identification is provided in a header of a binary XML message payload that is encoded using efficient XML interchange (EXI), the schemas describing the encoding/decoding of binary XML message payloads using EXI, wherein for each binary XML message controlling the storing comprises:
extracting the assigned identification of the schema from the payload header of the EXI encoded payload of the binary XML message; and
retrieving the schema information for decoding the EXI encoded payload of the binary XML message using the extracted assigned identification;

providing an interface for maintaining the schema information up-to-date in each component of the binary web service system by distributing the schema information to components of the system, wherein the processor and the memory including computer program code are further configured to cause the apparatus to send each component of the system a message regarding the schema via the interface to maintain the schema information up-to-date in each component of the binary web service system, wherein the processor and the memory including computer program code are further configured to cause the apparatus to verify the schema for validity, analyse the schema with one or more test payloads, and optimize the schema on the basis of the analysis, before storing and distributing the schema, and wherein the schema information comprises the identification of the schema, the address of the schema, and identification of the system.

* * * * *